May 27, 1947.        R. L. HALLOCK        2,421,201
FASTENING MEANS
Filed April 20, 1943
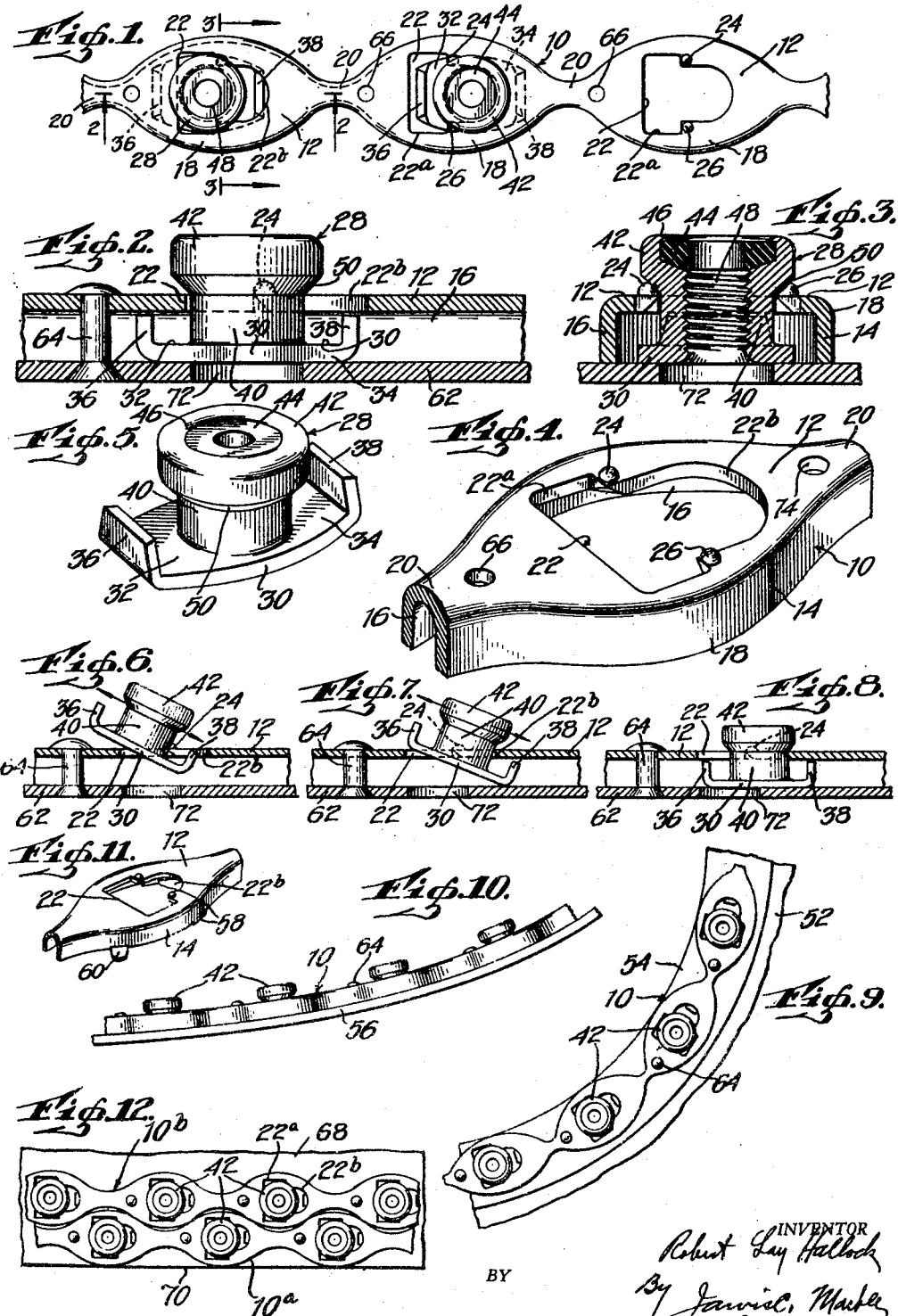
INVENTOR
Robert Lay Hallock
BY
ATTORNEY Patented May 27, 1947

2,421,201

UNITED STATES PATENT OFFICE 2,421,201

FASTENING MEANS

Robert Lay Hallock, Larchmont, N. Y., assignor to Elastic Stop Nut Corporation of America, Union, N. J., a corporation of New Jersey Application April 20, 1943, Serial No. 483,739

21 Claims. (Cl. 85—32)

1

The present invention relates to fastening devices and has particular reference to fastening devices of the kind providing a screw threaded connection for removably securing together two bodies at least one of which is of such thin section as to provide inadequate material to be directly threaded for the reception of a fastening screw or bolt. Still more particularly, the invention relates to fastening devices especially suited for removably securing bodies such as a cover plate or the like around the perimeter of an opening in a thin plate structure which cannot be directly threaded.

It is common practice, in order to effect the general type of fastening with which this invention is concerned, to aperture the thin section body at the place where attachment of another body is desired and to fix to the reverse side of the thin body a retaining member holding a threaded fastening element in registry with the aperture, into which a bolt or screw may be threaded to effect the desired attachment. Also, in cases where it is desired to attach a body such as a cover plate or the like along the margin of a relatively large opening in a plate structure it has heretofore been common practice to secure metal strips of channel form along the margin of such openings, such strips retaining a plurality of fastening elements such as nuts in spaced relation along the strip, with the nuts being spaced to register with suitable openings in the plate structure and openings in the web or base of the channel strip through which bolts or screws are inserted and threaded into the nuts to detachably secure another body to the plate structure.

In structures of the kind above referred to it is highly desirable to be able readily to remove any fastening element such as a nut from the retaining member after the latter has been secured in place and to insert a replacement in operative position, all without disturbing the connection between the retaining member and the body to which it is secured. Such removal and replacement is required in order to replace defective nuts and also in order to replace nuts in which the threads may have become damaged after installation by an operator trying to force a screw or bolt through the nut with the threads "crossed" so that the threads are damaged or even stripped.

Since structures of the kind referred to are extensively used in aircraft, another requirement is that they be of minimum weight and a still further requirement is imposed by the fact that the margins of openings where strip type

2 fasteners are employed and to which the strips must conform may be of curved or irregular outline.

While certain forms of fastening devices meet some of the above outlined requirements, none of the previously developed forms of which I am aware is capable of adequately meeting all of them and the general object of the present invention is the provision of a novel and improved form of fastening device which shall among other things be of minimum weight, permit the ready removal and replacement, without the use of special tools or distortion of the parts, of a fastening element from the retaining member after the latter has been installed, and which in the case of a strip type of retaining member is capable of being shaped on the job to conform to a curved or irregular line of desired installation.

The manner in which the above general object and other and more detailed objects hereinafter appearing are achieved, and the advantages to be derived from use of the present invention, may best be understood from a consideration of the ensuing portion of this specification, taken in conjunction with the accompanying drawings, which disclose by way of example but without limitation, one suitable structural form of device for carrying the invention into effect, the scope of the invention being defined by the appended claims.

In the drawings:

Fig. 1 is a plan view of a strip type fastening device showing fastening elements in different positions in the strip retaining member;

Fig. 2 is a section on enlarged scale, taken on line 2—2 of Fig. 1;

Fig. 3 is a section on enlarged scale taken on line 3—3 of Fig. 1;

Fig. 4 is a perspective view on enlarged scale of a portion of the retaining member;

Fig. 5 is a perspective view on enlarged scale of a fastening element for use with the retaining member shown in Fig. 4;

Figs. 6 to 8 are sections similar to Fig. 2, showing the manner of assembling and disassembling the fastening element and retaining member;

Figs. 9 and 10 are views showing special applications of the retaining member to different bodies;

Fig. 11 is a fragmentary view showing different means for attachment of the retaining member to another body; and Fig. 12 is a view showing another special application of the device.

Referring now to the drawings, 10 designates a retaining member which in the illustrated embodiment is in the form of a channel of U-shaped cross section having a web portion 12 and flange portions or legs 14 and 16, the web portion being of varying width with relatively wide portions 18 connected by relatively narrow neck portions 20. The flanges 14 and 16 are sinuously curved to conform with the variation in the width of the web 12. While the alternating wide and narrow portions of the channel are not essential to certain aspects of the invention, they are preferably provided for reasons hereinafter appearing.

The web 12 of the channel is provided with a series of spaced apertures 22 located in the wide portions of the web, as will be most clearly evident from Figs. 1 and 4. Each of the apertures 22 in the example shown is formed with two portions of different configuration. One portion, indicated at 22a is wider transversely than is the second portion 22b, the two together forming in effect a T-shaped aperture of which the portion 22a constitutes the head and the portion 22b constitutes the stem. While the precise configuration of the aperture is not critical, it is preferably formed with one portion wider transversely than the other, for reasons hereinafter appearing. At the points on the perimeter where the portions 22a and 22b merge, the material of the web 12 is struck upwardly as indicated at 24 and 26 to provide at opposite sides of the aperture projections which as will be most clearly seen in Figs. 2, 3 and 4 are advantageously rounded on their upper faces to button-like form.

The fastening element for use with the retaining member 10 is in the embodiment illustrated a nut, preferably of the self-locking type in which the locking action is obtained by means of a fibre locking insert in accordance with the principles disclosed in Patent No. 1,550,282, granted to T. G. Rennerfelt.

In the example shown, this nut, indicated generally at 28 and advantageously drawn from sheet metal stock, comprises a base portion 30 providing two oppositely extending flange portions 32 and 34, the outer ends of which are bent upwardly to form fingers 36 and 38 as seen more clearly in Fig. 5. Also, as will be seen from this figure, the flange portions are tapered so that they are narrower at their free ends than at the center. The body portion of the nut which extends upwardly from the base comprises a neck portion 40 above which the body is flared outwardly to provide a head portion 42 containing a suitable recess for the reception of the locking insert 44, over which the upper edge of the head is crimped as at 46 to retain the insert in fixed position in the body. The body has an internally threaded bore 48, as will be more clearly evident from Fig. 3. The lower face of the head 42 is beveled as indicated at 50 to provide a conical shoulder between the head and neck portions of the nut. As will hereinafter be more clearly evident, the specific configuration of the nut may vary considerably within the scope of the invention. Insofar as the external shape of the body portion of the nut is concerned, the most important consideration is the provision of what may be termed a reentrant portion between the upper and lower portions of the nut such as is provided in the present example by the neck portion of smaller diameter than the head.

The manner in which the above described parts cooperate is best understood from a consideration of Figs. 1, 2 and 6 to 8. As shown in Fig. 6 the parts are assembled by inserting the nut angularly into the aperture, the flange portion 34 for example, being inserted through the portion 22a of the aperture. It will be evident by comparison of Figs. 4 and 5 that the width of this portion of the aperture is sufficient to permit this readily to be done. Fig. 7 shows the nut inserted in the opening somewhat further, to a position where the neck or reentrant portion 40 abuts against the end wall of the portion 22b of the aperture. In this position, the finger 36 at the free end of the flange portion 32 will just clear the end edge of the portion 22a of the aperture and the nut can then be moved to the position shown in Fig. 8. From Figs. 7 and 8 it will be seen that the transverse diameter, representing the greatest width of the neck portion 40, has passed between the projections 24 and 26 and with the nut in the position shown in Fig. 8 it will be evident that the nut will be held against dropping completely through the aperture by engagement of the head of the nut with the walls of the narrow portion 22b of the aperture. As will be seen from Fig. 8, the upper edges of the fingers 36 and 38, after the nut has been inserted to the position shown, are closely adjacent to the underface of the web portion 12 of the retaining member. From this position, the nut obviously may be removed from the retaining member by a reversal of the inserting process, either by grasping the head directly with the fingers and tiltingly extracting it, or in the case of a very small nut by inserting a wire, pencil point or other instrument into the nut bore to tilt and remove it. In order to fully assemble the nut and retaining member, the nut is moved laterally from the position shown in Fig. 8 to the position shown in Fig. 2, such movement being longitudinal of the retaining member and requiring the transverse diameter of the body portion of the nut to pass between the projections 24 and 26 which extend upwardly from the opposite sides of the aperture 22. The height of the fingers 36 and 38 is related to the height of the neck portion of the nut so that the nut cannot be shifted from the position shown in Fig. 8 to its assembled position shown in Fig. 2 without resistance from the projections 24 and 26, which in the example shown engage the bevelled shoulder 50, and have to be flexed from their normal positions in order to permit the body portion of the nut to pass from one position to the other. This flexure is readily obtained due to the elasticity of the material of the retaining member, the web portion of which in the present example can yield downwardly. It will thus be seen that from the position of the nut shown in Fig. 8, the nut is in effect snapped into its assembled or operative position shown in Fig. 2.

Referring now more particularly to Fig. 1, the nut illustrated in the central part of that figure is shown in plan view in a position corresponding to that shown in Fig. 8, from which it will be readily seen how the nut can be tilted and removed through the portion 22a of the aperture. Owing to the portion 22b of the aperture being relatively narrow, the neck 40 is held against material transverse displacement when in the position shown and further is prevented from rotating to any great extent in this position by the flange 34. Thus when the neck of the nut is in the portion 22b of the aperture it is insured that the flange 36 will be in registry with the portion 22a of the aperture for ready removal therethrough. The nut shown in the left hand portion of Fig. 1 is in its assembled or operative position corresponding to Fig. 2 and from this figure it will be seen that the finger 36 is entirely under the web portion 12 of the retaining member, while the outer corners of the finger 38 are beneath this web. Consequently, the nut is held against upward displacement or tilting due to any force from below, by engagement of these fingers with the underside of the web. Also it will be seen that the head 42 of the nut overlies portions of the margin of the aperture, the end edge of the portion 22a of the aperture and the projections 24 and 26 being beneath the underside of the head to prevent the nut from falling downwardly through the aperture.

As will also be observed, the spacing of the projections 24 and 26 on the web, with respect to each other and with respect to the end edge of the portion 22a of the aperture, is such as to permit limited lateral movement both transversely and longitudinally of the nut relative to the retaining member when the nut is in its assembled position. This movement permits the nut to center itself with respect to a screw or bolt inserted into it through an aperture in the body to which the retaining member is secured.

Rotation of the nut within the retaining member is prevented by engagement between the flange portions 32 and 34 of the base of the nut with the flanges or legs of the retaining member, and by reference to Fig. 1 it will be seen that the flange portions of the nut are advantageously tapered as shown in order to facilitate longitudinal movement of the nut back and forth between its assembled and removable positions without cocking or jamming between the legs of the channel.

It will be apparent from the foregoing description that the strip form of the retaining member provides a series of individual nut retaining pockets, connected by relatively narrow and flexible necks. Such a strip or channel is relatively flexible at the neck portions and consequently can readily be bent on the job to conform to any desired configuration. An example of this is shown in Fig. 9 wherein the retaining member is shown attached to a plate 52 having an opening with a curved margin 54 along which it is desired to secure the retaining member of the fastening device. In Fig. 10 another type of installation is illustrated in which the body to which the retaining member is secured is a plate 56, the surface of which at the place of attachment is concave.

The retaining member obviously may be attached to a body in numerous different ways. When both the retaining member and the body to which it is to be attached are metal, spot or projection welding may be employed, in which case the legs of the retaining member may advantageously be provided with projections for projection welding as indicated at 58 in Fig. 11, or with laterally projecting ears or tabs for spot welding, as shown at 60 in that figure. Usually, however, the preferred method of attachment is by riveting as illustrated in Fig. 2, wherein the retaining member is shown as being riveted to a plate 62 by means of a rivet 64. For riveted installations the retaining member is provided with suitable rivet holes 66, there preferably being one such hole located in the web for each individual pocket, all or only a part of which holes may be used for rivets. Usually the retaining member may adequately be secured by riveting only every other or even fewer of the pockets.

In connection with riveted construction it is to be noted that the holes 66 are preferably located to one side of the narrow neck portions 20, the reason for this being that experience has shown that when the rivet hole is placed in the narrow neck portion which may be bent in installations such as shown in Fig. 9, the web portion, thus weakened, is apt to buckle to an undesirable distorted form.

The form of retaining member comprising alternating wide and narrow portions is advantageous for a further type of installation where it may be desired to provide fastening elements at very closely spaced intervals. Such an installation is illustrated in Fig. 12 in which a body 68 is shown having a marginal edge 70 along which it is desired to have individual fastening connections provided at closely spaced intervals. In this arrangement, a first retaining strip 10a is secured close to the edge 70 and a second retaining strip 10b is secured adjacent to it in longitudinal offset relation, the wide and narrow portions of the two strips interfitting to reduce the transverse distance between the nuts which constitute the individual fastening elements. Consequently with this arrangement, any cover plate or the like to be secured to the body 62 does not have to overlap the marginal edge 70 to as great an extent as would otherwise be necessary in order to effect a connection between the parts.

It will be understood, of course, that the bodies to which the retaining member are secured are suitably apertured as indicated at 72 in Figs. 2 and 3, such apertures registering with the bores of the nuts when the retaining member is secured to the body and the nuts are in operative assembled position therein. The method of attachment of a second body to the one to which the retaining member is attached is accomplished in well known manner, a stud, bolt or other screw threaded element engaging the body to be attached being inserted through the aperture in the body to which the retaining member is secured and screwed into the nut. The use of a self-locking nut in such an installation is particularly advantageous for so called blind installations where the nut is relatively inaccessible in its installed position, since with such type of nut a connection secure against vibration is obtained without the use of lock washers, cotter pins or other locking means which would be difficult if not impossible to apply in such cases.

While the invention has been described with reference to a strip type of multiple unit fastener, it will be evident that advantageous features of the invention are equally applicable to individual fastening devices providing individual fastenings.

In such cases, the retaining member can be of the form shown in Fig. 4 or if desired, the flanges 14 and 16 may be joined at their ends to provide a continuous flange extending around the perimeter of the web in which the aperture 22 is formed. In the case of an individual fastening device a second rivet hole 74 is provided to enable the retaining member to be properly secured to the plate or other body in fixed position.

Ordinarily the parts will be made of sheet metal which can readily be drawn or stamped to desired shape and for aircraft and other light weight construction the retaining member will advantageously be of aluminum, magnesium or other light weight metal, while the fastening elements may be of such metal or of stronger and heavier metal such as steel in those cases where greater thread strength is desired than such light metals provide. Within the scope of the invention, materials other than metal may be used. In connection with the matter of strength, it will be observed that when the fastening elements are in use, the retaining member is not required to absorb the tension produced by the screw or bolt on the fastening element, since the face of the latter bears against the surface of the body to which the retaining member is attached.

It will be apparent to those skilled in the art that the invention may be embodied in many different specific forms of structure and that certain features of the invention may advantageously be used to the exclusion of others. It is therefore to be understood that the invention embraces all forms of structure falling within the scope of the appended claims.

What is claimed:

1. A fastening device comprising a retaining member adapted to be secured to another body, said member having a web portion provided with an aperture, and a fastening element extending through said aperture, said element being shiftable laterally of said aperture from a first position to a second position and being shaped to engage said member to be retained in assembled relation therewith when in said first position and to be removable therefrom through said aperture in a direction away from said body when shifted to said second position.

2. A fastening device comprising a retaining member adapted to be secured to another body, said member having a web portion provided with an aperture, and a fastening element extending through said aperture, said element being shiftable laterally of said aperture from a first position to a second position and being shaped to engage said member to be retained in assembled relation therewith when in said first position and to be removable therefrom through said aperture in a direction away from said body when shifted to said second position, said retaining member including means for retaining said element in said first position and said means being yieldable to permit said element to be shifted to said second position.

3. A fastening device comprising a retaining member adapted to be secured to another body, said member including a web portion provided with an aperture having portions of different configuration, a fastening element extending through said aperture, said element being shaped to engage said member to be retained in assembled relation therewith when in a first position passing through one of the portions of said aperture and being removable from said member in a direction away from said body when in a second position passing through another one of the portions of said aperture, and means for yieldingly retaining said element in said first position and permitting it to be shifted to said second position for removal from said member.

4. A fastening device comprising a retaining member having a portion of channel section adapted to be secured to another body with the channel recess facing the surface to which the member is attached, the web of said channel portion having an aperture, a fastening element, said element having a base portion within the channel recess shaped to engage the sides of said channel portion to prevent rotation of the element relative to said member, a head portion outside said channel and a reentrant portion passing through said aperture and said element being shiftable in said aperture from a first position in which the parts are engaged in assembled relation to a second position in which said element is removable from said member by passage of said base portion through said aperture.

5. A fastening device comprising a retaining member adapted to be secured to another body and a fastening element having a base portion and a body portion, said member having a web portion provided with an aperture, said aperture comprising a first portion having a width sufficient to permit passage therethrough of the base portion of said element and a second portion having an area sufficient to receive the body portion of said element, and projections formed on said web portion between the said portions of said aperture, said projections being located to permit the body portion of said element to pass freely into said second portion of said aperture when said base portion is inserted in tilted position through said first portion of said aperture and to yieldingly engage the body portion of said element to permit it to be snapped in lateral direction to a second position in which said body portion is located in said second portion of said aperture with the base portion of said element located beneath said web.

6. A fastening device comprising a retaining member shaped to provide an open pocket and adapted to be secured to another body, said member including a web portion having an aperture therein and a fastening element having a base portion and a reentrant body portion, the base portion being located in said pocket and coacting with the side walls thereof to prevent rotation of the element relative to said member, the reentrant part of the body portion of said element passing through said aperture and said aperture being shaped to permit said element to be shifted laterally thereof from a first position in which said element is engaged by said member to hold the parts in assembled relation to a second position in which the base portion of said element is removable through said aperture to disassemble the parts.

7. A fastening device comprising a retaining member shaped to provide an open pocket and adapted to be secured to another body, said member including a web portion having an aperture therein, and a fastening element having a base portion and a reentrant body portion, the base portion being located in said pocket and coacting with the side walls thereof to prevent rotation of the element relative to said member, the reentrant part of the body portion of said element passing through said aperture, said aperture being shaped to permit said element to be shifted laterally thereof from a first position in which said element is engaged by said member to hold the parts in assembled relation to a second position in which the base portion of said element is removable through said aperture to disassemble the parts, and said web portion having projections thereon for yieldingly engaging said element to resist movement of the element from said first position to said scond position.

8. A fastening device comprising a retaining member adapted to be secured to another body and including a web portion having an aperture, and a nut having a base portion, a head portion and a reentrant neck portion, the base portion of said nut being insertable through said aperture to a position in which said neck portion is located in one portion of said aperture and said aperture being shaped to permit lateral shifting of the inserted nut to a second position in which said neck portion is in another portion of said aperture and said web portion is interposed between the head and base portions of the nut to prevent axial displacement thereof from said member.

9. A fastening device comprising a retaining member adapted to be secured to another body and including a web portion having an aperture, and a nut having a base portion, a head portion and a reentrant neck portion, the base portion of said nut being insertable through said aperture to a position in which said neck portion is located in one portion of said aperture and said aperture being shaped to permit lateral shifting of the inserted nut to a second position in which said neck portion is in another portion of said aperture and said web portion is interposed between the head and base portions of the nut to prevent axial displacement thereof from said member, said retaining member having yieladble means located to engage said head portion to resist shifting of said nut to and from said second position.

10. In a fastening device of the character described, a flat web having an aperture therein, and a nut having a flanged base portion, a neck portion and a head portion, said neck portion being located in said aperture with said base portion located to engage one side of said web and said head portion located to engage the other side of the web, said neck portion being shiftable laterally in said aperture to a position in which the part of said base portion to one side of said neck portion is in registry with a portion of said aperture, whereby to permit the nut to be tilted and the base portion thereof withdrawn through the aperture.

11. In a fastening device of the character described, a flat web having an aperture therein, and a nut having a flanged base portion, a neck portion and a head portion, said neck portion being located in said aperture with said base portion located to engage one side of said web and said head portion located to engage the other side of the web, said neck portion being shiftable laterally in said aperture to a position in which the part of said base portion to one side of said neck portion is in registry with a portion of said aperture, whereby to permit the nut to be tilted and the base portion thereof withdrawn through the aperture, and means projecting from said web and positioned to engage said head to resist said lateral shifting of the nut.

12. In a fastening device of the character described, a retaining member providing a generally T-shaped aperture for the reception of a fastening element, said member being shaped adjacent to the places of juncture between the head and stem portions of the aperture to provide upwardly extending projections for releasably retaining an inserted element in the head portion of said aperture.

13. For use in a fastening device of the character described, a nut having a flanged base portion, a head portion and a reentrant portion between the base and head portions, said base portion including opposed flanges having upturned free ends providing fingers adapted to engage one side of an apertured plate structure, the opposite side of which is engaged by said head portion.

14. A multiple unit fastening device comprising a strip of sheet material having a plurality of spaced apertures therein, and a plurality of fastening elements each having a base portion and a reentrant body portion, said fastening elements being held in assembled relation with said strip with said reentrant portions passing through said apertures and positioned therein for engagement of other portions of the elements with the opposite sides of the strip to prevent disassembly of the parts.

15. A multiple unit fastening device comprising a strip of sheet material having a plurality of spaced apertures therein, and a plurality of fastening elements each having a base portion and a reentrant body portion, said fastening elements being held in assembled relation with said strip with said reentrant portions passing through said apertures and positioned therein for engagement of other portions of the elements with the opposite sides of the strip to prevent disassembly of the parts, said elements and said apertures being shaped to permit the elements to be shifted laterally of the respective apertures to positions permitting the base portions thereof to pass through the apertures.

16. A multiple unit fastening device comprising a channel shaped strip of sheet material having alternating wide and narrow portions providing a series of pockets and having apertures in the web portions of the pockets, and fastening elements passing through said apertures and held in assembled relation in said pockets, said fastening elements having base portions located in said pockets shaped to engage portions of the walls of the pockets to prevent the elements from rotating therein.

17. A fastening device comprising in combination a retaining member having an aperture therein and shaped to provide contact portions for engaging the surface of a body to which said member is to be attached and nut retaining portions at the edges of said aperture, said nut retaining portions being offset from said contact portions so as to lie in spaced relation to the surface of said body when said retaining member is installed, a nut removably assembled with said member, said nut having a base portion, a head portion and an intervening reentrant neck portion, said nut extending through said aperture with the neck portion thereof in the aperture and with the base portion thereof located below the aperture in a position to contact the surface of said body when the device is installed and to be restrained against rotation by contact with portions of said member, and said nut retaining portions of said member extending into the reentrant portion of the nut to prevent axial displacement of the nut from the retaining member when the nut is in assembled position, said aperture being shaped to permit removal of the nut from the retaining member upon lateral movement of the nut substantially parallel to itself from its assembled position, and means constituting a part of said member for yieldably resisting lateral movement of the nut from its assembled position.

18. A device as set forth in claim 17 in which said means comprises projections formed on said nut retaining portions of the member and arranged to permit lateral movement of the nut from its assembled position by a yielding snap action.

19. A device as set forth in claim 17 in which portions of said member engageable by said nut when in assembled position are spaced to provide limited movement of the nut in any lateral direction in its assembled position.

20. A device as set forth in claim 17 in which said member consists of a sheet metal strip of channel section having a plurality of apertures in the web portion thereof and in which a plurality of nuts are assembled, one in each of the apertures.

21. A device as set forth in claim 17 in which said member is of channel section form having the aperture in the web portion thereof and in which the nut is assembled with the base portion of the nut between the flanges of the member and with the base face of the nut facing the open side of the channel.

ROBERT LAY HALLOCK.

REFERENCES CITED

The following references are of record in the file of this patent:

UNITED STATES PATENTS

| Number | Name | Date |
|---|---|---|
| 2,144,350 | Swanstrom | Jan. 17, 1939 |
| 2,249,923 | Whitcombe | July 22, 1941 |
| 2,258,342 | Tinnerman | Oct. 7, 1941 |
| 2,273,648 | Kost | Feb. 17, 1942 |
| 2,285,273 | Hall et al. | June 2, 1942 |
| 2,329,158 | Gill | Sept. 7, 1943 |
| 1,396,185 | Furber | Nov. 8, 1921 |
| 2,144,553 | Simmonds | Jan. 17, 1939 |
| 2,252,932 | Johnson | Aug. 19, 1941 |
| 2,283,122 | Murphy | May 12, 1942 |

FOREIGN PATENTS

| Number | Country | Date |
|---|---|---|
| 247,576 | Great Britain | July 29, 1926 |